Patented Oct. 2, 1923.

1,469,414

UNITED STATES PATENT OFFICE.

GEORGE W. HERBEIN, OF SAN FRANCISCO, CALIFORNIA.

PRINTING INK.

No Drawing.  Application filed August 7, 1922. Serial No. 580,305.

*To all whom it may concern:*

Be it known that I, GEORGE W. HERBEIN, a citizen of the United States, and a resident of the city and county of San Francisco, State of California, have invented a certain new and useful Printing Ink, of which the following is a specification.

The invention relates to printing ink and particularly to the base, vehicle or carrier to which pigment is added to produce the finished ink. The invention relates further to a printing ink base made from petroleum residium, commercially termed fuel oil, or heavy crude oil, having a gravity of about 17° Baumé with a flash point of 150° F. and containing about 30% of asphaltum.

An object of the invention is to provide a printing ink on which a film or skin will not form on exposure of the ink to the air.

Another object of the invention is to provide a quick drying residium base ink.

A further object of the invention is to provide a process of making the ink of my invention.

The invention possesses other advantageous features, some of which, with the foregoing will be set forth at length in the following description where I shall outline in full, the preferred form of the ink of my invention and the method of making the same.

In accordance with my invention I mix the residium, a material or materials which serve to deodorize or partially deodorize, or desulphurize or partially desulphurize the residium, a material or materials which react to form a sludge or an imperfect soap which imparts the required body to the ink and preferably a material or materials which serve as driers. These ingredients are mixed together and heated to drive off any contained water and to cause the necessary reactions to go forward to produce the desired base. To this base I then add a material or materials which act as further driers and the desired pigment or dye. The material which I employ to deodorize the residium is preferably a mineral salt, such as copper sulphate, chloride or nitrate, or a mineral base such as copper oxide (CuO), either dry or mixed in water, which acts upon or absorbs the sulphides present in the oil becoming an impure copper sulphide; the acids in the resin will act partially on this oxide thereby causing solution in the process. The materials employed to produce the sludge or imperfect soap are preferably resin, or resinous materials or resinates of minerals and an alkali, such as sodium hydrate. The resin is melted in the oil and the sodium hydrate reacts with the resin and oil. The drier added to the mass at this time is preferably a calcium or magnesium chloride, with or without water. To this mixture I preferably add water, either as free water or as the solvent for one or more of the added materials, so that sufficient water is present to insure the completion of the desired reaction. This mixture is then heated to dehydration or substantial dehydration, at which time it becomes a deodorized conglomerate sludge. To this sludge the desired driers and pigments are added.

I have produced very satisfactory ink from the following materials in the proportions stated:

|  | Per cent. |
|---|---|
| Residium | 86 to 95¼ |
| Resin | 1 to 10 |
| Copper nitrate | ¼ |
| Calcium chloride | 1 |
| Sodium hydrate | 1 |
| Sodium silicate | 1 |
| Water, sufficient quantity. | |

These ingredients are mixed and heated to dehydration to form the ink base after which the driers and pigments are added. I have obtained satisfactory results with an ink consisting of:

|  | Per cent. |
|---|---|
| Base | 65 |
| Linoleate of lead | 4 |
| Japan drier | 6 |
| Pigment | 25 |

While I have specified certain ingredients which enter into the ink of my invention, it is to be understood that their equivalents may be used with satisfactory results. For instance, in place of resin I may use other soap making materials such as oils, fats or waxes.

I claim:

1. A printing ink base comprising fuel oil, a deodorant comprising a copper salt, and an imperfect soap.

2. A printing ink base comprising fuel oil, a deodorant comprising a copper salt, a resinous material and a material which reacts therewith to form an imperfect soap.

3. A printing ink base comprising fuel oil, a salt of copper, rosin, an alkali which reacts with the rosin to form a sludge, and a drier.

4. A printing ink base comprising a dehydrated mixture of fuel oil, a copper salt, rosin, and sodium hydrate.

5. A printing ink base comprising a dehydrated sludge comprising fuel oil, a copper salt, rosin, sodium hydrate, and a drier.

6. A printing ink base comprising a dehydrated mixture of fuel oil, a copper salt deodorant, rosin, an alkali which reacts with the rosin to form a sludge, and a drier.

7. The process of making printing ink base which comprises heating a mixture of fuel oil and a deodorant with an imperfect soap.

8. The process of making printing ink which comprises heating a mixture of fuel oil, a deodorant, and an imperfect soap to form a base, and adding a drier and pigment to said base.

9. A printing ink base comprising the following ingredients: fuel oil, rosin, copper nitrate, calcium chloride sodium hydrate, sodium silicate, and water.

10. A printing ink comprising fuel oil, rosin, copper nitrate, calcium chloride, sodium hydrate, sodium silicate, linoleate of lead, a pigment, a drier, and water.

11. A printing ink base comprising the following ingredients in the proportions mentioned:

| | Per cent. |
|---|---|
| Fuel oil | 86 to 95½ |
| Rosin | 1 to 10 |
| Copper nitrate | ½ |
| Calcium chloride | 1 |
| Sodium hydrate | 1 |
| Sodium silicate | 1 |
| Water, sufficient quantity. | |

12. A printing ink comprising the following ingredients in the proportions stated:

| | Per cent. | Per cent. |
|---|---|---|
| Fuel oil | 86 to 95½ | |
| Rosin | 1 to 10 | |
| Copper nitrate | ½ | 65 |
| Calcium chloride | 1 | |
| Sodium hydrate | 1 | |
| Sodium silicate | 1 | |
| Linoleate of lead | | 4 |
| Pigment | | 25 |
| Drier | | 6 |
| Water sufficient quantity. | | |

In testimony whereof, I, have hereunto set my hand.

GEORGE W. HERBEIN.